(No Model.)
A. COOLEY.
HAY STACKER.
No. 294,768. Patented Mar. 11, 1884.
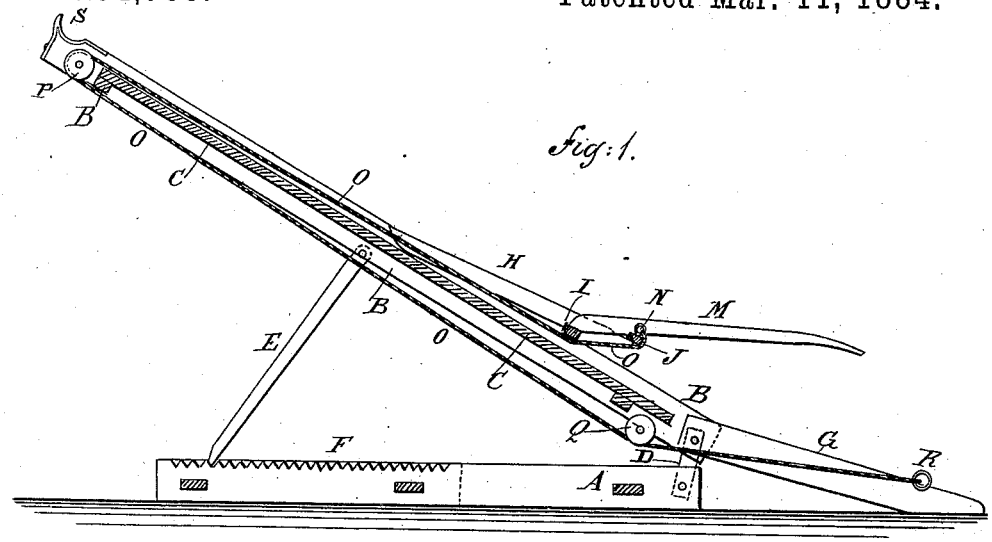
Fig. 1.
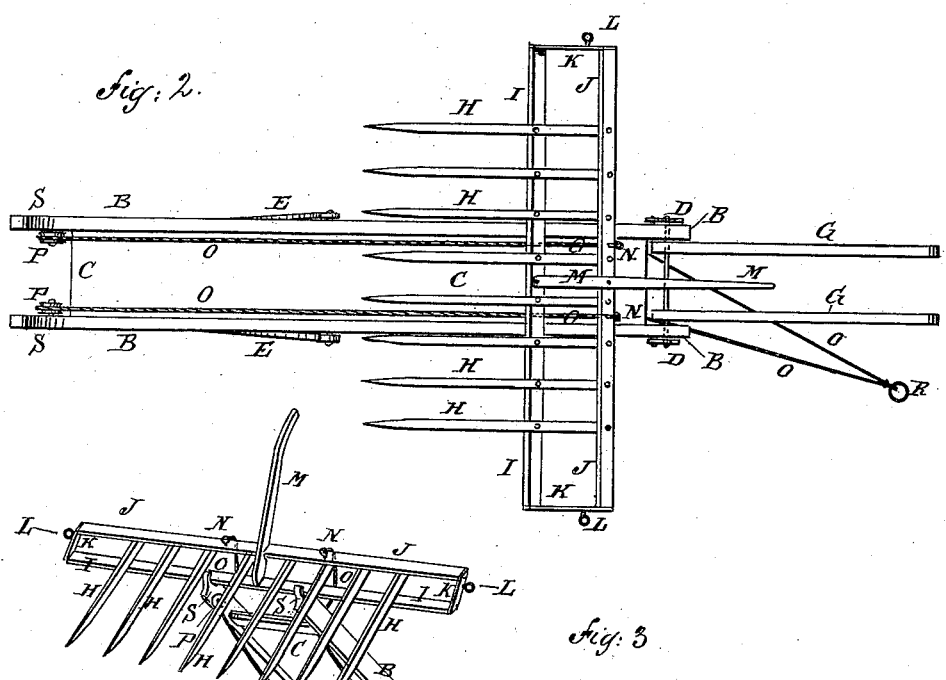
Fig. 2.
Fig. 3.
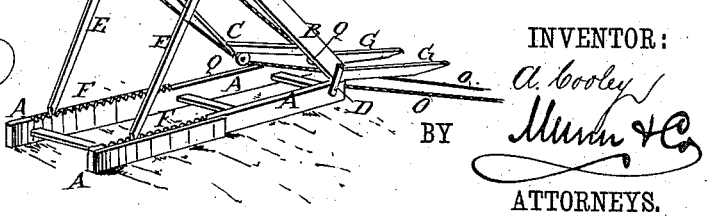
WITNESSES:
Chas. Nida
C. Sedgwick
INVENTOR:
A. Cooley
BY Munn & Co.
ATTORNEYS.

United States Patent Office.

ALBERT COOLEY, OF OSCEOLA, IOWA.

HAY-STACKER.

SPECIFICATION forming part of Letters Patent No. 294,768, dated March 11, 1884.

Application filed September 21, 1883. (No model.)

*To all whom it may concern:*

Be it known that I, ALBERT COOLEY, of Osceola, in the county of Clarke and State of Iowa, have invented a new and useful Improvement in Hay-Stackers, of which the following is a full, clear, and exact description.

Reference is to be had to the accompanying drawings, forming a part of this specification, in which the same letters of reference indicate the same or corresponding parts in all the figures.

Figure 1 is a sectional side elevation of my improvement. Fig. 2 is a plan view of the same. Fig. 3 is a perspective view of the same, showing the rake in position for dumping the hay.

The object of this invention is to facilitate the operation of stacking hay.

A represents the base-frame of the stacker, which is formed of two side bars connected by cross-bars. B is the inclined or elevating frame, which is formed of two side bars connected by cross-bars, and having bottom boards, C, attached to the said cross-bars. The outer ends of the frames A B are hinged to each other by two metallic straps, D, the ends of which are pivoted to the outer sides of the ends of the side bars of the said frames by bolts, as shown in Figs. 1, 2, and 3, so that the inner end of the frame B can be readily raised and lowered.

To the side bars of the frame B are hinged, by bolts or other suitable means, the upper ends of two braces or pawls, E, the lower ends of which engage with the teeth of ratchet-bars F, formed upon or attached to the side bars of the frame A, so that the upper end of the inclined frame B can be readily raised as the stack increases in height.

To the lower ends of the side bars of the frame B, at their inner sides, are hinged, by bolts or a rod, the upper ends of two bars, G, the lower ends of which are tapered or beveled to rest upon the ground, so that the said bars will form an inclined approach to the lower end of the frame B.

H are the rake-teeth, to the lower sides of which, at a little distance from their rear ends, is attached a cross-bar, I, and to the upper sides of the rear ends of the said teeth is attached a second cross-bar, J. The ends of the cross-bars I J are connected by short bars K, to which are attached eyebolts L, for the attachment of the ropes by means of which the rake is drawn when collecting the hay and drawing it to the stacker.

To the cross-bars I J are attached one or more handles, M, for convenience in guiding and controlling the rake.

To the rear cross-bar, J, of the rake, upon the opposite sides of its center, are attached eyebolts N, to receive the ends of the elevating-ropes O, which pass up along the upper side of the frame B, pass over pulleys P, pivoted to the inner sides of the upper ends of the side bars of the frame B, pass down along the under side of the said frame, pass under pulleys Q, pivoted to the inner sides of the lower parts of the side bars of the said frame B, and their ends are brought together and are attached to a ring, R, so that the draft can be readily attached and detached. The ropes are designed to be attached to the eyebolts L and N by means of snap-hooks, so that they can be readily and quickly attached and detached.

In the upper edges of the upper ends of the side bars of the frame B are formed recesses S, or to them are attached hooks, to receive the forward cross-bar, I, of the rake, and serve as bearings for the said cross-bar to turn in when dumping the hay.

In using the stacker, the hay is collected in the meadow with the rake H I J, and the loaded rake is drawn to the stacker and up the inclined bars G. The horses are then detached from the loaded rake and attached to an empty rake, which is drawn away for another rake-load. The upper ends of the hoisting-ropes O are attached to the rake, a horse is attached to the lower ends of the said ropes, and the loaded rake is drawn up the inclined frame B. As the loaded rake reaches the upper end of the frame B, the cross-bar I enters the recesses or hooks S, and the hay is dumped by its own weight. The ropes O are then slackened, the rake slides down the inclined frame, the said ropes are detached from the rake, and the empty rake is drawn back, ready to be drawn away for another load, and leaving the stacker ready to receive another loaded rake.

Having thus described my invention, I claim as new and desire to secure by Letters Patent—

In a hay-stacker, the combination, with the frames A B, connected together, and one having hooks or recesses S at its upper end, and a bottom board, C, of the rake H I J K, having rearwardly-projecting teeth, and the ropes O O, connected to the cross-bar J of the rake, in the rear of the cross-bar I thereof, the lower outer ends of the teeth of the rake resting upon the board C, and the ropes acting upon the under side of the rake-head, as shown and described, and for the purpose set forth.

ALBERT COOLEY.

Witnesses:
JAMES S. BISHOP,
JOHN H. ALEXANDER.